(12) United States Patent
Ikeda et al.

(10) Patent No.: US 12,140,095 B2
(45) Date of Patent: Nov. 12, 2024

(54) CONTROLLER FOR INTERNAL COMBUSTION ENGINE

(71) Applicant: TOYOTA JIDOSHA KABUSHIKI KAISHA, Toyota (JP)

(72) Inventors: Yuto Ikeda, Okazaki (JP); Koji Umezawa, Susono (JP); Makoto Yamazaki, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/436,036

(22) Filed: Feb. 8, 2024

(65) Prior Publication Data

US 2024/0271582 A1 Aug. 15, 2024

(30) Foreign Application Priority Data

Feb. 15, 2023 (JP) ................... 2023-021528

(51) Int. Cl.
| | |
|---|---|
| *F02D 41/02* | (2006.01) |
| *F01N 3/20* | (2006.01) |
| *F02D 41/00* | (2006.01) |
| *F02D 41/14* | (2006.01) |

(52) U.S. Cl.
CPC ......... *F02D 41/0235* (2013.01); *F01N 3/208* (2013.01); *F02D 41/0027* (2013.01); *F02D 41/1475* (2013.01); *F01N 2610/02* (2013.01); *F01N 2900/1814* (2013.01); *F02D 2250/36* (2013.01)

(58) Field of Classification Search
CPC ............. F02D 41/0235; F02D 41/0027; F02D 41/1475; F02D 2250/36; F01N 3/208; F01N 2610/02; F01N 2900/1814; F01N 3/08; F01N 3/20; F01N 3/24
USPC .......................................................... 60/282
See application file for complete search history.

(56) References Cited

U.S. PATENT DOCUMENTS

| | | | | |
|---|---|---|---|---|
| 2007/0163244 | A1* | 7/2007 | Federle | F02D 41/005 60/301 |
| 2007/0245714 | A1* | 10/2007 | Frazier | F01N 3/208 60/276 |
| 2008/0276598 | A1* | 11/2008 | Gresens | F01N 11/00 60/286 |

(Continued)

FOREIGN PATENT DOCUMENTS

| | | |
|---|---|---|
| JP | 2014118946 A | 6/2014 |
| JP | 2018044528 A | 3/2018 |

*Primary Examiner* — Kenneth J Hansen
*Assistant Examiner* — Kelsey L Stanek

(57) ABSTRACT

An internal combustion engine includes a fuel injection valve configured to inject hydrogen gas into the cylinder, a selective catalytic reduction catalyst located in an exhaust passage and configured to remove NOx, a urea water injection valve configured to inject urea water into the catalyst, a tank that stores urea water injected by the urea water injection valve, and a remaining amount detection sensor configured to detect a remaining amount of urea water stored in the tank. A controller for the internal combustion engine is configured to execute a restriction process that controls, when the remaining amount is less than a set value, an injection amount of hydrogen gas by the fuel injection valve such that an air excess ratio in the cylinder becomes greater than or equal to a specified excess ratio that is greater than 1.

4 Claims, 2 Drawing Sheets

(56) References Cited

U.S. PATENT DOCUMENTS

| | | | |
|---|---|---|---|
| 2011/0067382 A1* | 3/2011 | Federle | F02D 41/005 60/274 |
| 2012/0010786 A1* | 1/2012 | Stickel | F01N 9/00 73/114.71 |
| 2018/0080362 A1 | 3/2018 | Kasai et al. | |

* cited by examiner

CONTROLLER FOR INTERNAL COMBUSTION ENGINE

1. FIELD

The present disclosure relates to a controller for an internal combustion engine.

2. DESCRIPTION OF RELATED ART

An exhaust purifying apparatus for an internal combustion engine disclosed in Japanese Laid-Open Patent Publication No. 2018-044528 includes an SCR catalyst, a urea water injection valve, and a tank. The SCR catalyst is located in the exhaust passage. The urea water injection valve is located upstream of the SCR catalyst. The tank stores urea water. The urea water injection valve injects urea water stored in the tank toward the SCR catalyst. The SCR catalyst removes NOx contained in exhaust gas by using ammonia generated from the urea water as a reducing agent.

An internal combustion engine that uses hydrogen gas as fuel includes an exhaust purifying apparatus as disclosed in the above publication to remove NOx contained in exhaust gas. While the internal combustion engine is running, the urea water stored in the tank may be reduced. If the urea water is insufficient, NOx is discharged to the outside without being removed. Thus, it is difficult to continue driving the internal combustion engine.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A controller for an internal combustion engine according to an aspect of the present disclosure is provided. The internal combustion engine includes a fuel injection valve configured to inject hydrogen gas that is to be supplied to a cylinder, a selective catalytic reduction catalyst located in an exhaust passage and configured to remove NOx, a urea water injection valve located upstream of the catalyst in the exhaust passage and configured to inject urea water into the catalyst, a tank that stores urea water injected by the urea water injection valve, and a remaining amount detection sensor configured to detect a remaining amount of urea water stored in the tank. The controller includes processing circuitry. The processing circuitry is configured to execute a restriction process that controls, when the remaining amount is less than a set value, an injection amount of hydrogen gas by the fuel injection valve such that an air excess ratio in the cylinder becomes greater than or equal to a specified excess ratio that is greater than 1.

A controller for an internal combustion engine according to an aspect of the present disclosure is provided. The internal combustion engine includes a fuel injection valve configured to inject hydrogen gas that is to be supplied to a cylinder, a selective catalytic reduction catalyst located in an exhaust passage and configured to remove NOx, a urea water injection valve located upstream of the catalyst in the exhaust passage and configured to inject urea water into the catalyst, a tank that stores urea water injected by the urea water injection valve, and a remaining amount detection sensor configured to detect a remaining amount of urea water stored in the tank. The controller comprises processing circuitry. The processing circuitry is configured to execute a restriction process that controls an injection amount of hydrogen gas by the fuel injection valve such that an air excess ratio in the cylinder is greater when the remaining amount is less than the set value than when the remaining amount is greater than or equal to the set value.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the modes, devices, and/or systems described. Modifications and equivalents of the modes, devices, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An embodiment of a controller for an internal combustion engine will now be described with reference to the drawings.

Schematic Configuration of Internal Combustion Engine

Figure 1:
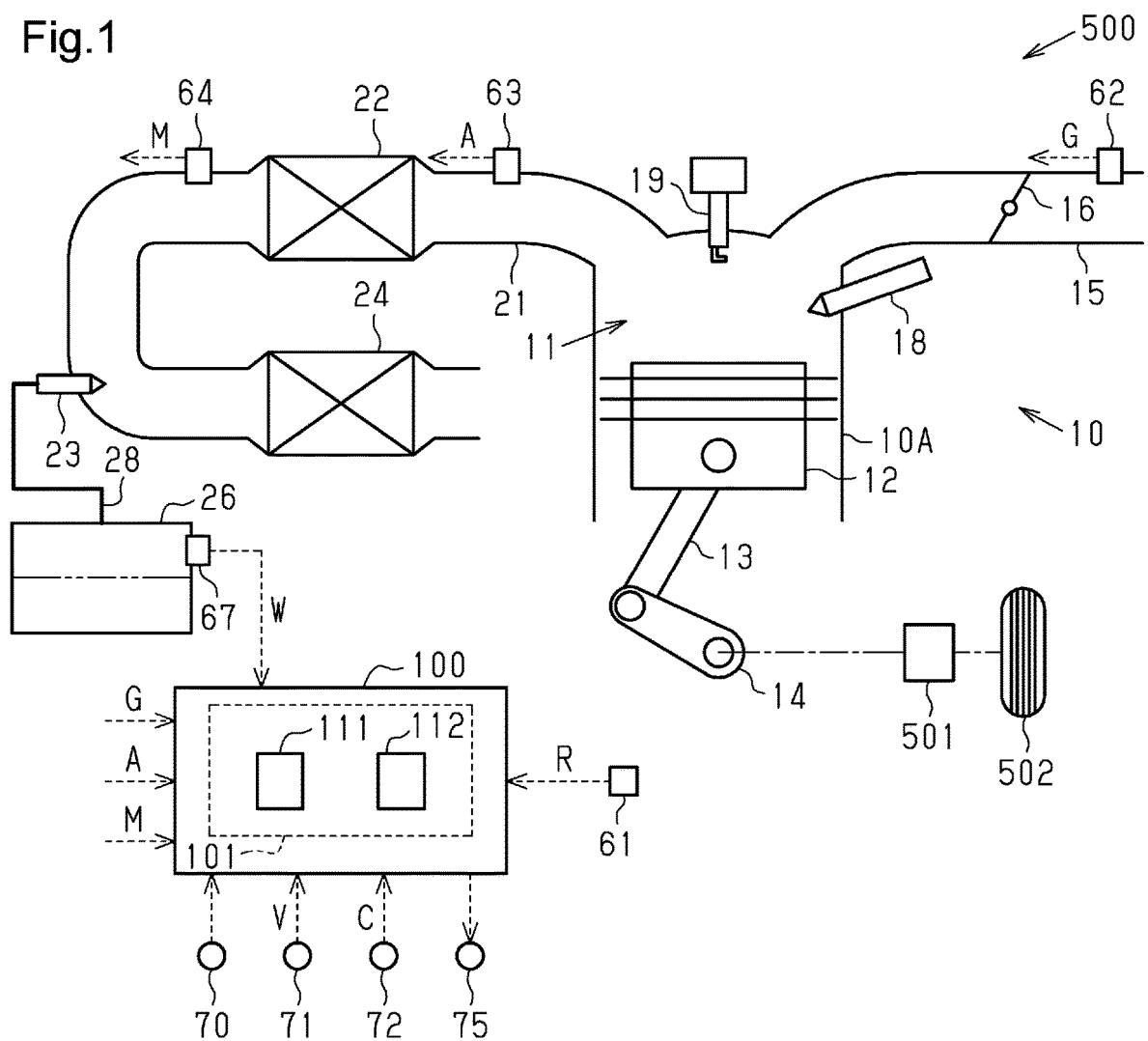
FIG. 1 is a schematic diagram showing the configuration of an internal combustion engine.

As shown in FIG. 1, a vehicle 500 includes an internal combustion engine 10. The internal combustion engine 10 is a driving source of the vehicle 500. The internal combustion engine 10 includes an engine body 10A, cylinders 11, pistons 12, connecting rods 13, and a crankshaft 14. FIG. 1 shows only one of the cylinders 11. The same applies to the pistons 12 and the connecting rods 13. Each piston 12 and each connecting rod 13 are disposed in a corresponding cylinder 11. The number of the cylinders 11 is four.

The cylinders 11 are spaces defined in the engine body 10A. The cylinders 11 are spaces for burning an air-fuel mixture of fuel and intake air. The piston 12 is located in the cylinder 11. The piston 12 reciprocates in the cylinder 11. The piston 12 is coupled to the crankshaft 14 by the connecting rod 13. The crankshaft 14 rotates as the piston 12 reciprocates. The crankshaft 14 is an output shaft of the internal combustion engine 10. The crankshaft 14 is coupled to drive wheels 502 by, for example, an automatic transmission 501 and a differential.

The internal combustion engine 10 includes fuel injection valves 18. FIG. 1 shows only one of the fuel injection valves 18. Each fuel injection valve 18 is disposed in a corresponding cylinder 11. The fuel injection valve 18 injects hydrogen gas as fuel. The fuel injection valve 18 directly supplies fuel to the cylinder 11 without passing through an intake passage 15 (described later).

The internal combustion engine 10 includes ignition plugs 19. FIG. 1 shows only one of the ignition plugs 19. Each ignition plug 19 is disposed in a corresponding cylinder 11. The tip of the ignition plug 19 is located in the cylinder 11. The ignition plug 19 ignites the air-fuel mixture in the cylinder 11.

The internal combustion engine 10 includes an intake passage 15 and a throttle valve 16. Intake air is drawn through the intake passage 15 into each cylinder 11. The intake passage 15 is connected to the cylinders 11. The throttle valve 16 is located in the intake passage 15. The open degree of the throttle valve 16 is adjustable. An intake air amount G varies depending on the open degree of the throttle valve 16.

The internal combustion engine 10 includes an exhaust passage 21, an oxidation catalyst 22, a urea water injection valve 23, and a selective catalytic reduction catalyst (hereinafter referred to as an SCR catalyst) 24. Exhaust gas is discharged from the cylinders 11 through the exhaust passage 21. The exhaust passage 21 is connected to the cylinders 11. The oxidation catalyst 22 is located in the exhaust passage 21. The oxidation catalyst 22 oxidizes components contained in the exhaust gas. The SCR catalyst 24 is located downstream of the oxidation catalyst 22 in the exhaust passage 21. The urea water injection valve 23 is located in the exhaust passage 21 between the oxidation catalyst 22 and the SCR catalyst 24. That is, the urea water injection valve 23 is located upstream of the SCR catalyst 24 in the exhaust passage 21. The urea water injection valve 23 injects urea water to the SCR catalyst 24. The SCR catalyst 24 reduces ammonia generated from urea water injected by the urea water injection valve 23 as a reducing agent, and reduces NOx (nitrogen oxide) contained in the exhaust gas to nitrogen and water. That is, the SCR catalyst 24 removes NOx in the exhaust gas.

The internal combustion engine 10 includes a tank 26 and a connection passage 28. The tank 26 stores urea water injected by the urea water injection valve 23. In FIG. 1, an example of the surface height of the urea water is represented by the long dashed double-short dashed line. The connection passage 28 connects the tank 26 to the urea water injection valve 23. Through the connection passage 28, the urea water stored in the tank 26 is supplied to the urea water injection valve 23.

The internal combustion engine 10 includes a crank position sensor 61, an air flow meter 62, an air-fuel ratio sensor 63, a NOx sensor 64, and a remaining amount detection sensor 67. The crank position sensor 61 is located proximate to the crankshaft 14. The crank position sensor 61 detects a rotation position R of the crankshaft 14. The air flow meter 62 is located upstream of the throttle valve 16 in the intake passage 15. The air flow meter 62 detects an intake air amount G. The air-fuel ratio sensor 63 is located upstream of the oxidation catalyst 22 in the exhaust passage 21. The air-fuel ratio sensor 63 detects an air-fuel ratio A of the air-fuel mixture in the cylinders 11. The NOx sensor 64 is located between the oxidation catalyst 22 and the SCR catalyst 24. The NOx sensor 64 detects a NOx concentration M in the exhaust gas. The remaining amount detection sensor 67 is attached to the tank 26. The remaining amount detection sensor 67 detects a urea remaining amount W, which is the remaining amount of urea water stored in the tank 26. These sensors each repeatedly send a signal corresponding to the detected information to the controller 100 (described later).

The vehicle 500 includes a vehicle speed sensor 71 and an accelerator sensor 72. The vehicle speed sensor 71 detects a traveling speed V of the vehicle 500. The accelerator sensor 72 detects an operation amount C of an accelerator pedal of the vehicle 500. These sensors each repeatedly send a signal corresponding to the detected information to the controller 100 (described later).

The vehicle 500 includes an ignition switch 70 and a notification lamp 75. The occupant commands the controller 100 to start the internal combustion engine 10 through operation of the ignition switch 70. The ignition switch 70 is turned on or off in response to operation of the occupant. The notification lamp 75 indicates that a first restriction process or a second restriction process, which will be discussed below, is being executed. The notification lamp 75 is provided on the meter panel in the passenger compartment.

Controller

The vehicle 500 includes a controller 100. The controller 100 includes processing circuitry 101, which includes a CPU 111 and a ROM 112. The ROM 112 stores, in advance, various programs that have been described by the CPU 111. The ROM 112 stores, in advance, various types of data required by the CPU 111 to execute various types of programs.

The controller 100 receives a signal from the ignition switch 70. While the ignition switch 70 is on, the controller 100 repeatedly receives signals from various sensors mounted on the vehicle 500. Based on the received signals, the controller 100 repeatedly calculates various parameters related to the state of the internal combustion engine 10. For example, the controller 100 calculates the rotation speed of the crankshaft 14 based on the rotation position R of the crankshaft 14. The controller 100 uses the air-fuel ratio A of the air-fuel mixture in the cylinder 11 to calculate an air excess ratio λ of the air-fuel mixture in the cylinder 11. The air excess ratio λ represents the ratio of the actual air-fuel ratio A to a stoichiometric air-fuel ratio AS. That is, combustion in the internal combustion engine 10 when the air excess ratio λ is 1 is a stoichiometric combustion in the stoichiometric air-fuel ratio AS. When the air excess ratio λ is greater than 1, the combustion of the internal combustion engine 10 is a lean combustion at the air-fuel ratio A, which is leaner than the stoichiometric air-fuel ratio AS. In the following description, the air excess ratio λ of the air-fuel mixture in the cylinder 11 is simply referred to as the air excess ratio λ in the cylinder 11.

The controller 100 controls the internal combustion engine 10. While the ignition switch 70 is on, the controller 100 repeatedly calculates the target torque of the internal combustion engine 10 based on the traveling speed V of the vehicle 500 and the operation amount C of the accelerator pedal. The controller 100 uses the target torque to control the internal combustion engine 10. The controller 100 calculates the target torque to be larger as the operation amount C of the accelerator pedal increases. To control the internal combustion engine 10, the controller 100 refers to the signals from the above-described sensors and the information calculated from the sensors as necessary.

Relationship Between Air Excess Ratio $\lambda$ and NOx

Figure 2:
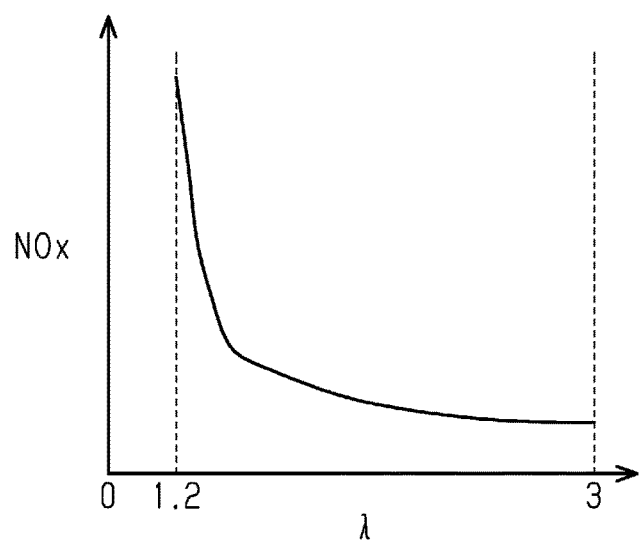
FIG. 2 is a diagram illustrating the relationship between the air excess ratio in the internal combustion engine of FIG. 1 and the generation amount of NOx.

To control the internal combustion engine 10, the controller 100 may impose restriction on the air excess ratio $\lambda$ in the cylinder 11. The relationship between the air excess ratio $\lambda$ and the generation amount of NOx, which form the basis for imposing such a restriction, will now be described. FIG. 2 illustrates the relationship between the air excess ratio $\lambda$ and the generation amount of NOx in the internal combustion engine 10. FIG. 2 shows a representative air excess ratio $\lambda$ from various air excess ratios $\lambda$ in a range from 1.2 to 3. The generation amount of NOx is, for example, expressed as the weight ratio of NOx in the exhaust gas. As is known in the art, in the internal combustion engine 10, NOx is generated during the process of combustion reaction of hydrogen gas. The generation amount of NOx increases and decreases in correspondence with the air excess ratio $\lambda$ in the cylinder 11. Although not illustrated in detail, when the hydrogen gas is burned lean in the internal combustion engine 10, the generation amount of NOx is maximized at a specific maximum value at which the air excess ratio $\lambda$ is slightly greater than 1. The specific maximum value is a value relatively close to 1.2. As the air excess ratio $\lambda$ increases from the specific maximum value as shown in FIG. 2, the generation amount of NOx gradually decreases. When the air excess ratio $\lambda$ becomes 3, the generation amount of NOx becomes less than or equal to an allowable value. The allowable value is the maximum value of the generation amount of NOx that allows the emission amount of NOx for external air to be less than the restriction value even if urea water is not injected from the urea water injection valve 23.

Control of Internal Combustion Engine

While the ignition switch 70 is on, the controller 100 repeatedly executes engine control for operating the internal combustion engine 10 at predetermined control cycles. The series of processes in the engine control will now be described. The control cycles are the same as the cycles for which the controller 100 calculates the target torque. The control cycle is, for example, one second.

Figure 3:
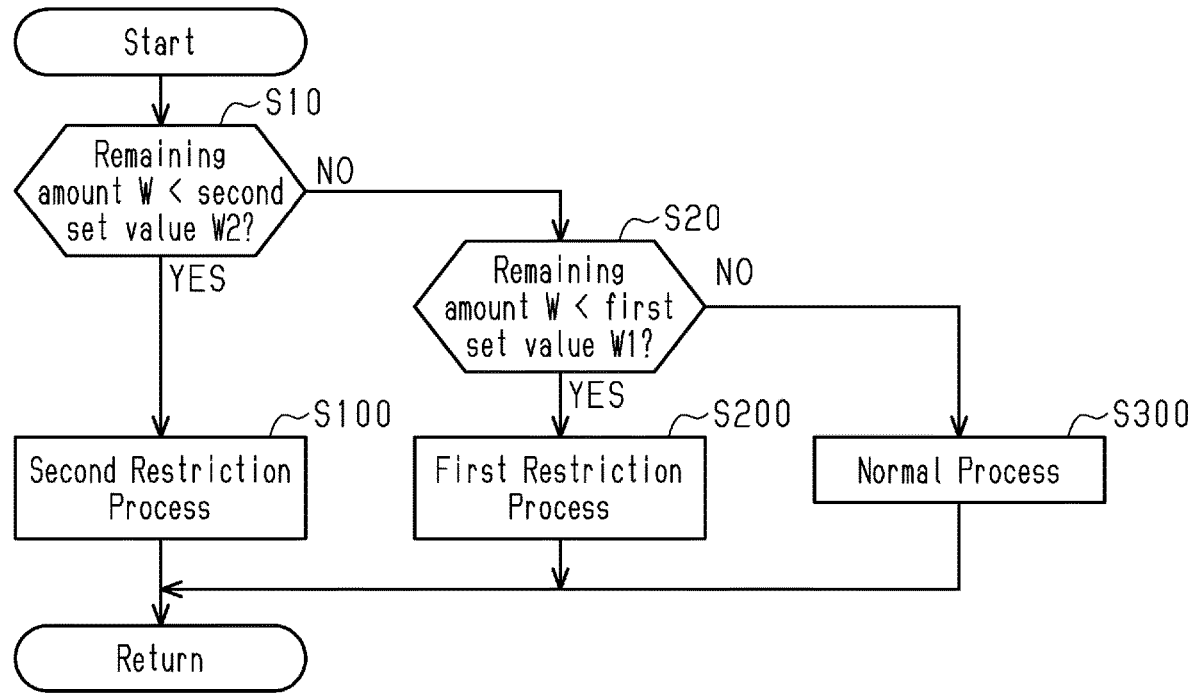
FIG. 3 is a flowchart illustrating a procedure of engine control for the internal combustion engine of FIG. 1.

As shown in FIG. 3, when starting the engine control, the controller 100 first executes the process of step S10. In step S10, the controller 100 determines whether the latest urea remaining amount W detected by the remaining amount detection sensor 67 is less than the second set value W2. The second set value W2 is a predetermined fixed value. The second set value W2 indicates that the urea remaining amount W is considerably small. The second set value W2 is the value of the urea remaining amount W that allows the vehicle 500 to travel. When the latest urea remaining amount W is greater than or equal to the second set value W2 (step S10: NO), the controller 100 advances the process to step S20.

In step S20, the controller 100 determines whether the urea remaining amount W referred to in step S10 is less than the first set value W1. The first set value W1 is a predetermined fixed value that is larger than the second set value W2. The first set value W1 indicates that the urea remaining amount W has been reduced to an extent that needs to be dealt with. When the urea remaining amount W is greater than or equal to the first set value W1 (step S20: NO), the controller 100 turns off the notification lamp 75 and then advances the process to step S300.

In step S300, the controller 100 executes the normal process of the internal combustion engine 10. In the normal process, the controller 100 controls parameters such as the open degree of the throttle valve 16, the injection amount of hydrogen gas by the fuel injection valve 18, and the ignition timing of the ignition plug 19 based on the latest target torque, without imposing any restriction on the air excess ratio $\lambda$ in the cylinder 11. In this case, the controller 100 uses various maps or the like to set an optimal combination of the control target values for these parameters so as to achieve the target torque. The controller 100 continues the control with which each parameter is set to a corresponding control target value for a certain time corresponding to the control cycle. In addition, in the normal process, the controller 100 injects urea water by the urea water injection valve 23. As the newest NOx concentration M detected by the NOx sensor 64 increases, the controller 100 increases the injection amount of urea water by the urea water injection valve 23. After executing the normal process as described above for a certain period of time corresponding to the control cycle, the controller 100 ends the process of step S300. Thereafter, the controller 100 temporarily ends the series of processes related to the engine control. Then, the controller 100 executes step S10 again. The optimal combination is a combination taking into consideration, for example, the prevention of pre-ignition and the improvement of fuel economy. The same applies to the first restriction process and the second restriction process, which will be discussed below.

When the urea remaining amount W is less than the first set value W1 in step S20 (step S20: YES), the controller 100 turns on the notification lamp 75 and then advances the process to step S200.

In step S200, the controller 100 executes the first restriction process. In the first restriction process, the controller 100 imposes a first condition on the air excess ratio $\lambda$ in the cylinder 11 and then uses the latest target torque to control the open degree of the throttle valve 16, the injection amount of hydrogen gas by the fuel injection valve 18, and the ignition timing of the ignition plug 19. The first condition is that the air excess ratio $\lambda$ in the cylinder 11 is greater than or equal to a first excess ratio $\lambda 1$. The controller 100 refers to various maps to set an optimal combination of control target values for parameters including the open degree of the throttle valve 16, the injection amount of hydrogen gas by the fuel injection valve 18, and the ignition timing of the ignition plug 19 such that the first condition is satisfied and the target torque is satisfied. Then, the controller 100 executes control for setting each parameter to the corresponding set control target value. That is, the controller 100 controls the open degree of the throttle valve 16, the injection amount of hydrogen gas by the fuel injection valve 18, and the ignition timing of the ignition plug 19 so as to satisfy the first condition. The first excess ratio $\lambda 1$ is a predetermined fixed value. The first excess ratio $\lambda 1$ is greater than the specific maximum value illustrated in FIG. 2 and is less than 3. The first excess ratio $\lambda 1$ is, for example, 2. In the same manner as the normal process, the controller 100 causes the urea water injection valve 23 to inject urea water in the first restriction process. The manner in which the injection amount of urea water is determined in this process is the same as the manner described in the normal process. After executing the first restriction process as described above for a certain period of time corresponding to the control cycle, the controller 100 ends the process of step S200. Thereafter, the controller 100 temporarily ends the series of processes related to the engine control. Then, the controller 100 executes step S10 again.

In step S10, when determining that the urea remaining amount W is less than the second set value W2 (step S10: YES), the controller 100 turns on the notification lamp 75 and then advances the process to step S100. In this case, the controller 100 turns on the notification lamp 75 in a color that differs from that in a case in which the determination of step S20 is YES.

In step S100, the controller 100 executes the second restriction process. In the second restriction process, the controller 100 imposes a second condition on the air excess ratio λ in the cylinder 11 and then uses the latest target torque to control the open degree of the throttle valve 16, the injection amount of hydrogen gas by the fuel injection valve 18, and the ignition timing of the ignition plug 19. The second condition is that the air excess ratio λ in the cylinder 11 is greater than or equal to a second excess ratio λ2. The controller 100 refers to various maps to set an optimal combination of control target values for parameters including the open degree of the throttle valve 16, the injection amount of hydrogen gas by the fuel injection valve 18, and the ignition timing of the ignition plug 19 such that the second condition is satisfied and the target torque is satisfied. Then, the controller 100 executes control for setting each parameter to the corresponding set control target value. That is, the controller 100 controls the open degree of the throttle valve 16, the injection amount of hydrogen gas by the fuel injection valve 18, and the ignition timing of the ignition plug 19 so as to satisfy the second condition. For example, the controller 100 fully opens the throttle valve 16 and injects hydrogen gas by an amount that satisfies the second condition. The second excess ratio λ2 is a predetermined fixed value. The second excess ratio λ2 of the present embodiment is 3. In the second restriction process, the controller 100 prohibits the urea water injection valve 23 from injecting urea water. That is, in the second restriction process, the controller 100 does not inject urea water. After executing the second restriction process as described above for a certain period of time corresponding to the control cycle, the controller 100 ends the process of step S100. Thereafter, the controller 100 temporarily ends the series of processes related to the engine control. Then, the controller 100 executes step S10 again.

In this configuration, the first restriction process is also referred to as a restriction process. The first excess ratio λ1 is also referred to as a specified excess ratio. The first set value W1 is also referred to as a set value.

Operation of Embodiment

Figure 4:
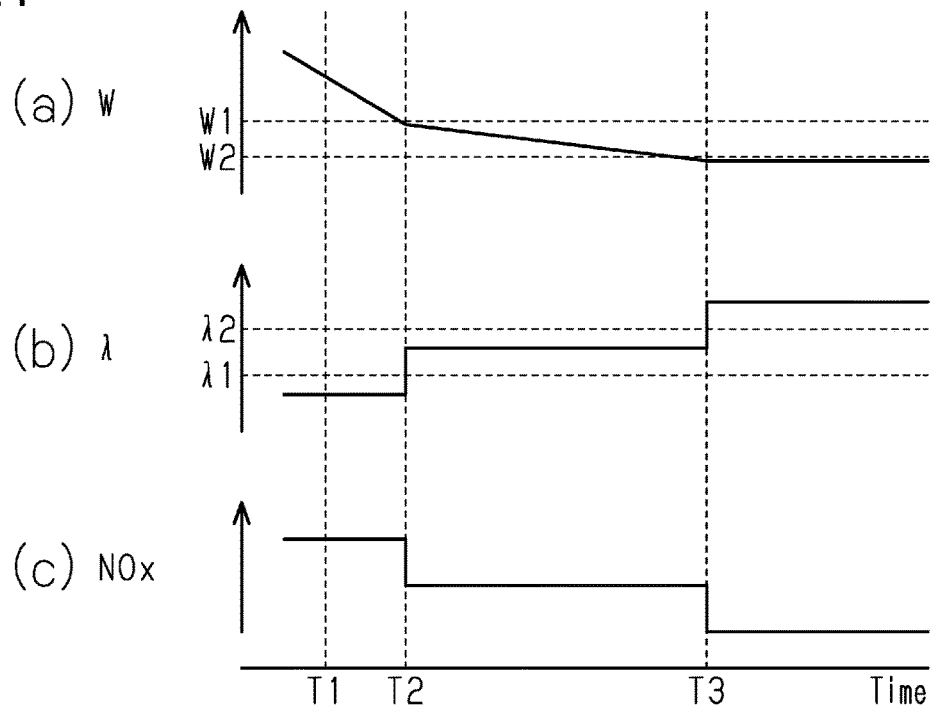
FIG. 4 is a timing diagram illustrating examples of changes in the parameters that result from the engine control of FIG. 3.

FIG. 4 is a timing diagram illustrating examples of changes in three parameters during operation of the internal combustion engine 10. The three parameters are the urea remaining amount W, the air excess ratio λ in the cylinder 11, and the generation amount of NOx. To facilitate understanding, FIG. 4 illustrates an example in which the air excess ratio λ is constant at time T2, from time T2 to time T3, and at time T3. The changes in each parameter shown in FIG. 4 including the changes in the air excess ratio λ do not necessarily math the actual ones.

As shown in section (a) of FIG. 4, at time T1 during operation of the internal combustion engine 10, it is determined that the urea remaining amount W is greater than or equal to the first set value W1 (step S10: NO, step S20: NO). In this case, the controller 100 controls the internal combustion engine 10 through the normal process. That is, as shown in section (b) of FIG. 4, the controller 100 controls the internal combustion engine 10 without imposing any restriction on the air excess ratio λ in the cylinder 11. In this case, for example, when the target torque is relatively large, the controller 100 may control the internal combustion engine 10 such that the air excess ratio λ in the cylinder 11 is relatively close to the specific maximum value. Thus, in the relationship between the air excess ratio λ and the generation amount of NOx described in FIG. 2, the generation amount of NOx may be increased during the execution of the normal process as shown in section (c) of FIG. 4. This increases the amount of consumption of urea water to remove such NOx. As a result, as shown in section (a) of FIG. 4, during the normal process, the urea remaining amount W is decreased by a relatively great amount.

As shown in section (a) of FIG. 4, it is assumed at time T2 that the urea remaining amount W is less than the first set value W1 and greater than or equal to the second set value W2 (step S10: NO, step S20: YES). Then, after time T2, the controller 100 controls the internal combustion engine 10 through the first restriction process. That is, as shown in section (b) of FIG. 4, the controller 100 controls the internal combustion engine 10 such that the air excess ratio λ in the cylinder 11 becomes greater than or equal to the first excess ratio λ1. Accordingly, as shown in section (c) of FIG. 4, the amount of NOx generated after time T2 is less than that before time T2. This reduces the amount of consumption of the urea water. Thus, as shown in section (a) of FIG. 4, the degree of decrease in the urea water is reduced.

As shown in section (a) of FIG. 4, it is assumed that the urea remaining amount W has become less than the second set value W2 at time T3 (step S10: YES). After time T3, the controller 100 controls the internal combustion engine 10 through the second restriction process. That is, the controller 100 controls the internal combustion engine 10 such that the air excess ratio λ in the cylinder 11 becomes greater than or equal to the second excess ratio λ2. Accordingly, as shown in section (c) of FIG. 4, the amount of NOx generated in the internal combustion engine 10 is significantly reduced. Specifically, the generation amount of NOx is reduced to a level at which urea water does not need to be injected from the urea water injection valve 23. Thus, in the second restriction process, the controller 100 prohibits the urea water injection valve 23 from injecting urea water. Thus, as shown in section (a) of FIG. 4, the urea remaining amount W is not reduced after time T3.

Advantages of Embodiment (1) In the first restriction process and the second restriction process, the controller 100 increases the air excess ratio λ to perform lean combustion in the cylinder 11. In this case, as described in FIG. 2, the generation amount of NOx due to combustion of fuel decreases. This reduces the amount of urea water required for removing NOx. Thus, the injection amount of urea water by the urea water injection valve 23 is reduced or becomes 0. Thus, in the above-described configuration, in which the first restriction process and the second restriction process are executed, the decrease in the urea remaining amount W is limited when the urea remaining amount W is reduced. If the urea remaining amount W becomes excessive or insufficient, NOx is discharged to the outside without being removed. This makes it difficult to continue the internal combustion engine 10. In this respect, if the urea remaining amount W is prevented from being reduced as in the above configuration, the time during which the internal combustion engine 10 can continue to operate when the urea remaining amount W is reduced is extended.

(2) When the air excess ratio λ is increased to perform lean combustion in the cylinder 11, the torque that can be output by the internal combustion engine 10 is reduced. Thus, when the first restriction process and the second restriction process are executed, the torque that can be output by the internal combustion engine 10 may be less than the target torque. In this regard, in the above configuration, when the urea remaining amount W is still sufficient, the first restriction process is executed to impose restriction on the air excess ratio λ. This reduces the influence on the torque of the internal combustion engine 10 when restriction is imposed on the air excess ratio λ. In the above configuration, the second restriction process, which significantly reduces the urea remaining amount W, enhances the restriction to the air excess ratio λ. Additionally, the above configuration prohibits the urea water injection valve 23 from injecting urea water. By changing the degree of limitation of the air excess ratio λ in correspondence with the urea remaining amount W in this manner, the influence of restriction on the torque of the internal combustion engine 10 on the air excess ratio λ is limited and the reduction in the urea remaining amount W is limited.

(3) When the air excess ratio λ is greater than or equal to 3, the generation amount of NOx due to combustion of fuel is substantially zero. Accordingly, there is no need to inject urea water to remove NOx. In the above configuration, the second restriction process is executed when the urea remaining amount W is significantly reduced. The air excess ratio λ is set to greater than or equal to 3 and the urea water injection valve 23 is prohibited from injecting urea water. Thus, the consumption of further urea water will be eliminated. Hence, the minimum urea remaining amount W is maintained.

Modifications

The above embodiment may be modified as follows. The above embodiment and the following modifications can be combined as long as the combined modifications remain technically consistent with each other.

The method for defining the first set value W1 is not limited to the example of the above embodiment. The first set value W1 simply needs to be set such that the first restriction process is executed properly under a situation in which the first restriction process needs to be executed.

The method for defining the second set value W2 is not limited to the example of the above embodiment. The second set value W2 simply needs to be set such that the second restriction process is executed properly under the condition that the second restriction process needs to be executed.

The value of the first excess ratio λ1 is not limited to the example of the above embodiment. Taking into consideration the balance between the first excess ratio λ1 and the first set value W1, the first excess ratio λ1 simply needs to be set such that an appropriate limit to the air excess ratio λ can be made in the first restriction process. The first excess ratio λ1 simply needs to be set to a value greater than 1. Further, the first excess ratio λ1 simply needs to be set to a value greater than the specific maximum value.

The value of the second excess ratio λ2 is not limited to the example of the above embodiment. Based on the balance between the second set value W2 and the second excess ratio λ2, the second excess ratio λ2 only needs to be determined such that the proper air excess ratio λ can be limited in the second restriction process. The second excess ratio λ2 may be set to a value greater than the first excess ratio λ1.

In the second restriction process, urea water injection by the urea water injection valve 23 does not necessarily need to be restricted. Depending on the second excessive increase the second excess ratio λ2, urea water may need to be injected.

The above embodiment controls the internal combustion engine 10 by imposing restriction on the air excess ratio λ at two stages with reference to the first set value W1 and the second set value W2 during the engine control. Instead of this configuration, the internal combustion engine 10 may be controlled with restriction on the air excess ratio λ at three or more stages depending on the urea remaining amount W.

In the engine control, the second restriction process may be omitted. That is, in the engine control, the air excess ratio λ may be limited only to one stage.

In the above modification, the injection of urea water by the urea water injection valve 23 may be prohibited in correspondence with restriction on the air excess ratio λ only at one stage when restriction is imposed on the air excess ratio λ.

The configuration of the internal combustion engine 10 is not limited to the example of the above embodiment. For example, the fuel injection valve 18 may supply hydrogen gas to the cylinder 11 through the intake passage 15. The number of the cylinders 11 may be changed. The internal combustion engine 10 only needs to include both of the following first elements and the second elements. The first elements are the fuel injection valve 18, which injects hydrogen gas that is to be supplied to the cylinder 11, the SCR catalyst 24, which is located in the exhaust passage 21, and the urea water injection valve 23, which injects urea water onto the SCR catalyst 24. The second elements are the tank 26, which stores urea water, and the remaining amount detection sensor 67, which detects the urea remaining amount W in the tank 26.

The overall configuration of the vehicle 500 is not limited to the example of the above embodiment. The vehicle 500 may include a motor generator as the driving source of the vehicle 500 in addition to the internal combustion engine 10.

The means for notifying the occupant that the first restriction process or the second restriction process is being executed is not limited to the notification lamp 75. The notification or voice guidance of a message may be performed to indicate that the first restriction process or the second restriction process is being executed.

A switch may be provided in the passenger compartment of the vehicle 500. The execution switch is used by the occupant to instruct execution of the first restriction process. The execution switch is turned on or off in response to operation of an occupant. In such a configuration, when the execution switch is turned on, the controller 100 may determine that the urea remaining amount W has become less than the first set value W1 and execute the first restriction process. For example, if the urea remaining amount W is displayed on the meter panel, the occupant can determine whether the user needs to conserve the consumption of the urea water. This allows the occupant to turn on or off the execution switch when necessary.

The upper limit of the air excess ratio λ in the cylinder 11 may be set for the normal process. For example, the normal process may set a condition that the air excess ratio λ in the cylinder 11 is less than a first excess ratio λ1. In this case, the first restriction process executes the following predetermined control if the normal process and the first restriction process are compared with each other. That is, the controller 100 controls the injection amount of hydrogen gas by the fuel injection valve 18 such that the air excess ratio λ in the cylinder 11 is larger when the urea remaining amount W is less than the first set value W1 and greater than or equal to the second set value W2 than when the urea remaining amount W is greater than or equal to the first set value W1. For example, even under a condition in which the normal process and the first restriction process use the same target torque, the controller 100 executes this predetermined control in the first restriction process. In this configuration, the first restriction process reduces the amount of NOx generated by the combustion of fuel in comparison with the normal process. This reduces the amount of urea water required for removing NOx. This reduces the injection amount of urea water by the urea water injection valve 23. This prevents the urea remaining amount W from being reduced.

In the above modification, the first excess ratio λ1 does not necessarily need to be a fixed value, but may be set variably in correspondence with the traveling state of the vehicle 500 or the like. In this case, for example, under a condition in which the normal process and the first restriction process use the same target torque, the air excess ratio λ in the cylinder 11 may be set to the same first excess ratio λ1. In this case, the first excess ratio λ1 may be set to be smaller as the target torque increases. This limits the decrease in the urea remaining amount W when the first restriction process is executed, while reducing restriction on the torque of the internal combustion engine 10 that is achievable in the first restriction process.

The processing circuitry 101 is not limited to a device that includes a CPU and a ROM and executes software processing. That is, the processing circuitry 101 may be modified as long as it has any one of the following configurations (a) to (c).

(a) The processing circuitry 101 includes one or more processors that execute various processes in accordance with a computer program. The processor includes a CPU and a memory, such as a RAM and ROM. The memory stores program codes or instructions configured to cause the CPU to execute the processes. The memory, or a computer-readable medium, includes any type of medium that is accessible by general-purpose computers and dedicated computers.

(b) The processing circuitry 101 includes one or more dedicated hardware circuits that execute various processes. Examples of the dedicated hardware circuits include an application specific integrated circuit (ASIC) and a field programmable gate array (FPGA).

(c) The processing circuitry 101 includes one or more processors that execute part of various processes in accordance with a computer program and one or more dedicated hardware circuits that execute the remaining processes.

The invention claimed is:

1. A controller for an internal combustion engine, wherein the internal combustion engine includes:
   a fuel injection valve configured to inject hydrogen gas that is to be supplied to a cylinder;
   a selective catalytic reduction catalyst located in an exhaust passage and configured to remove NOx;
   a urea water injection valve located upstream of the catalyst in the exhaust passage and configured to inject urea water into the catalyst;
   a tank that stores urea water injected by the urea water injection valve; and
   a remaining amount detection sensor configured to detect a remaining amount of urea water stored in the tank, wherein
   the controller comprises processing circuitry, and
   the processing circuitry is configured to execute a restriction process that controls, when the remaining amount is less than a set value, an injection amount of hydrogen gas by the fuel injection valve such that an air excess ratio in the cylinder becomes greater than or equal to a specified excess ratio that is greater than 1.

2. The controller according to claim 1, wherein
   the restriction process is a first restriction process, the set value is a first set value, and the specified excess ratio is a first excess ratio, and
   the processing circuitry is configured to execute:
      the first restriction process that controls the injection amount of hydrogen gas by the fuel injection valve such that the air excess ratio in the cylinder becomes greater than or equal to the first excess ratio when the remaining amount is greater than or equal to a second set value and less than the first set value, the second set value being smaller than the first set value; and
      a second restriction process that controls the injection amount of the hydrogen gas by the fuel injection valve such that the air excess ratio in the cylinder becomes greater than or equal to a second excess ratio when the remaining amount is less than the second set value, the second excess ratio being greater than the first excess ratio.

3. The controller according to claim 2, wherein
   the processing circuitry is configured to, in the second restriction process, control the injection amount of the hydrogen gas by the fuel injection valve such that the air excess ratio in the cylinder becomes greater than or equal to three and prohibit the urea water injection valve from injecting the urea water.

4. A controller for an internal combustion engine, wherein the internal combustion engine includes:
   a fuel injection valve configured to inject hydrogen gas that is to be supplied to a cylinder;
   a selective catalytic reduction catalyst located in an exhaust passage and configured to remove NOx;
   a urea water injection valve located upstream of the catalyst in the exhaust passage and configured to inject urea water into the catalyst;
   a tank that stores urea water injected by the urea water injection valve; and
   a remaining amount detection sensor configured to detect a remaining amount of urea water stored in the tank, wherein
   the controller comprises processing circuitry, and
   the processing circuitry is configured to execute a restriction process that controls an injection amount of hydrogen gas by the fuel injection valve such that an air excess ratio in the cylinder is greater when the remaining amount is less than a set value than when the remaining amount is greater than or equal to the set value.

* * * * *